United States Patent [19]
Schulze

[11] Patent Number: 6,167,369
[45] Date of Patent: Dec. 26, 2000

[54] AUTOMATIC LANGUAGE IDENTIFICATION USING BOTH N-GRAM AND WORD INFORMATION

[75] Inventor: Bruno M. Schulze, Swampscott, Mass.

[73] Assignee: Xerox Company, Stamford, Conn.

[21] Appl. No.: 09/219,615

[22] Filed: Dec. 23, 1998

[51] Int. Cl.[7] .................................................. G06F 17/27
[52] U.S. Cl. .................................................. 704/9; 704/10
[58] Field of Search ............................. 704/1, 8–10, 255, 704/257; 707/530, 531, 532, 536

[56] References Cited

U.S. PATENT DOCUMENTS

| | | | |
|---|---|---|---|
| 4,610,025 | 9/1986 | Blum et al. | 382/117 |
| 4,773,009 | 9/1988 | Kucera et al. | 707/531 |
| 4,829,580 | 5/1989 | Church | 704/260 |
| 4,930,077 | 5/1990 | Fan | 704/8 |
| 5,062,143 | 10/1991 | Schmitt | 382/230 |
| 5,182,708 | 1/1993 | Ejiri | 704/1 |
| 5,251,131 | 10/1993 | Masand et al. | 704/9 |
| 5,371,807 | 12/1994 | Register et al. | 382/159 |
| 5,377,280 | 12/1994 | Nakayama | 382/17 |
| 5,392,419 | 2/1995 | Walton | 395/500 |
| 5,418,951 | 5/1995 | Damashek | 707/5 |
| 5,548,507 | 8/1996 | Martino et al. | 704/1 |
| 5,913,185 | 6/1999 | Martino et al. | 704/8 |

OTHER PUBLICATIONS

BEESLEY, KENNETH R. "Language Identifieer: A Computer Program for Automatic Natural–Language Identification of On–Line Text," In the Proceedings of the 29th Annual Conference of the American Translators Association, 1988.

CAVNAR, WILLIAM B. ET AL. "N–Gram–Based Text Categorization," In Symposium on Document Analysis and Information Retrieval, 1994.

DUNNING, TED "Statistical Identification of Language,"CLR Tech Report (MCCS–94–273), 1994.

GREFENSTETTE, GREGORY "Comparing Two Language Identification Schemes," In Proceedings of 3rd International Conference on Statistical Analysis of Textual Data (JADT 1995), Rome, Italy; December, 1995, vol. II, pp. 263–268.

IntelliScope® Language Recognizer, Inso Corporation, 1997.

SIBUN, PENELOPE ET AL. "Language Determination: Natural Language Processing from Scanned Document Images, " Proceedings of the 4th Conference on Applied Natural Language Processing, Stuttgart, Germany; 1994, pp. 15–21.

*Primary Examiner*—Forester W. Isen
*Assistant Examiner*—Patrick N. Edouard

[57] ABSTRACT

The predominant language of a sample text is automatically identified using probability data that include N-gram probability data for at least one language and word probability data for at least one language. The N-gram probability data of a language indicate, for each N-gram, the probability that it occurs if the language is predominant. Similarly, the word probability data of a language indicate, for each word, the probability that it occurs if the language is predominant. The probability data are used to automatically obtain sample probability data for at least two languages. The sample probability data include N-gram probability information for at least one language and word probability information for at least one language. The sample probability data are used to automatically obtain language identifying data identifying the language whose sample probability data indicate the highest probability. The N-grams can be trigrams, while the words can be short words of no more than five characters. Some languages can have both trigram and word probabilities, while some can have only trigram probabilities.

13 Claims, 9 Drawing Sheets

|      | 1     | 2     | 3     | 4     | 5     | 6     | 10    | 15    | 20    |
|------|-------|-------|-------|-------|-------|-------|-------|-------|-------|
| DUT  | 57.5% | 84.3% | 90.4% | 94.8% | 97.5% | 98.1% | 99.5% | 99.9% | 99.7% |
| ENG  | 62.3% | 85.2% | 92.8% | 95.5% | 97.8% | 98.8% | 99.7% | 99.9% | 100%  |
| FIN  | 68.9% | 90.6% | 95.6% | 97.9% | 98.7% | 99.3% | 99.9% | 100%  | 100%  |
| FRE  | 60.3% | 82.5% | 93.3% | 95.1% | 97.9% | 98.5% | 99.4% | 99.9% | 100%  |
| GER  | 62.8% | 85.8% | 93.0% | 96.6% | 97.6% | 98.6% | 99.7% | 100%  | 100%  |
| ITA  | 49.4% | 80.9% | 90.2% | 94.0% | 97.4% | 97.7% | 99.4% | 99.9% | 99.9% |
| POR  | 57.7% | 81.3% | 88.2% | 94.1% | 95.9% | 97.2% | 98.9% | 99.6% | 100%  |
| SPA  | 55.5% | 79.8% | 89.8% | 95.0% | 94.8% | 96.9% | 99.4% | 99.7% | 99.9% |
| SWE  | 48.5% | 77.2% | 88.0% | 93.4% | 96.0% | 97.1% | 99.5% | 99.6% | 99.6% |
| MEAN | 58.1% | 83.1% | 91.3% | 95.2% | 97.1% | 98.0% | 99.5% | 99.8% | 99.9% |

FIG. 7

|  | 1 | 2 | 3 | 4 | 5 | 6 | 10 | 15 | 20 |
|---|---|---|---|---|---|---|---|---|---|
| DUT | 71.1% | 92.4% | 96.5% | 98.1% | 99.5% | 99.2% | 99.9% | 99.9% | 99.8% |
| ENG | 74.4% | 93.6% | 96.6% | 98.7% | 99.8% | 99.9% | 99.9% | 99.9% | 100% |
| FIN | 85.5% | 95.8% | 98.7% | 99.2% | 99.4% | 99.5% | 100% | 100% | 100% |
| FRE | 70.1% | 89.1% | 95.7% | 98.0% | 99.4% | 99.5% | 99.9% | 99.9% | 100% |
| GER | 79.7% | 94.7% | 97.9% | 99.3% | 99.3% | 99.8% | 100% | 100% | 100% |
| ITA | 69.7% | 91.5% | 95.3% | 97.9% | 99.3% | 99.9% | 100% | 100% | 99.9% |
| POR | 75.4% | 85.8% | 92.1% | 96.6% | 97.4% | 98.4% | 99.6% | 99.9% | 100% |
| SPA | 69.0% | 86.6% | 94.0% | 97.9% | 97.3% | 98.8% | 99.7% | 100% | 99.9% |
| SWE | 77.3% | 93.5% | 97.9% | 98.7% | 99.3% | 99.5% | 99.7% | 99.7% | 99.8% |
| MEAN | 74.7% | 91.4% | 96.1% | 98.3% | 99.0% | 99.4% | 99.9% | 99.9% | 99.9% |
| IMPROVEMENT | 28.6% | 10.0% | 5.3% | 3.3% | 2.0% | 1.4% | 0.4% | 0.1% | 0% |

*FIG. 8*

AUTOMATIC LANGUAGE IDENTIFICATION USING BOTH N-GRAM AND WORD INFORMATION

FIELD OF THE INVENTION

The invention relates to automatically identifying the language of a text.

BACKGROUND AND SUMMARY OF THE INVENTION

A number of techniques have been proposed for automatically identifying the language of a text. Grefenstette, G., "Comparing Two Language Identification Schemes," JADT 1995, 3rd International Conference on Statistical Analysis of Textual Data, Rome, 11–13 December 1995, pp. 263–268, compares two techniques, one using letter trigrams, the other based on common short words.

The trigram technique described by Grefenstette tokenizes large samples of text from each of a number of different languages using the space as sole separator and adding an underscore before and after each token to mark initial and terminal bigrams. The frequency of sequences of three characters in each language is then counted. Trigrams with more than a minimum frequency are retained, and probability of a retained trigram is approximated by summing the frequency of all retained trigrams for the language and dividing the trigram's frequency by the sum of frequencies. The probabilities are then used to guess the language of a sentence by dividing the sentence into trigrams and calculating the probability of the sequence of trigrams for each language, assigning a minimal probability to trigrams without assigned probabilities. The language with the highest probability for the sequence of trigrams is chosen.

The short word technique described by Grefenstette similarly tokenizes large samples of text from each of a number of different languages and calculates the frequency of all tokens, generally words, of five characters or less. Tokens with more than a minimum frequency are retained, and probability of a retained token is approximated as in the trigram technique. The probabilities are then used to guess the language of a sentence by tokenizing the sentence and calculating the probability of the sequence of tokens for each language, assigning a minimal probability to tokens without assigned probabilities. The probability that a sentence belongs to a given language is taken as the product of the probabilities of the tokens.

Grefenstette compared the techniques by feeding each sentence to each technique to obtain two language guesses. Either technique works well on long sentences, and trigrams are most robust for shorter sentences. This can be expected because shorter sentences may be titles or section headings that contain characteristic trigrams but may not contain short words. Using short words is slightly more rapid in execution because there are less words than trigrams in a given sentence, and each word or trigram contributes a multiplication to the probability calculation.

Martino et al., U.S. Pat. No. 5,548,507, disclose a language identification process using coded language words. In discussing prior art, Martino et al. distinguish trigram and n-gram character based systems. Martino et al. instead disclose a technique that reads word codes from a document and compares the word codes to predetermined lists of words selected from language or genres of interest. The language or genre of the document is identified by a process that determines which language's word list most closely matches the words in the document. Closeness of match is weighted by frequency of occurrence of listed words in each language or genre.

Dunning, T., "Statistical Identification of Language," Computing Research Laboratory Technical Report MCCS-94-273, New Mexico State University, 1994, pp. 1–29, discloses a statistically based program that learns to distinguish between languages. In relation to previous work, Dunning discusses unique letter combination techniques, common word techniques, N-gram counting with ad hoc weighting, and N-gram counting with rank order statistics. Dunning then discloses an N-gram technique that develops a set of character level language models from training data and then uses the language models to estimate the likelihood that a particular test string might have been generated by each of the language models.

The invention addresses basic problems that arise in automatic language identification using short or common word techniques and N-gram techniques. One problem relates to sample size, another to the different contexts in which each technique works better.

As noted by Grefenstette, both short word and N-gram techniques work well on a large sample such as a long sentence, while N-gram techniques are more robust for smaller samples such as short sentences. Even N-gram techniques, however, work less well as the size of the sample decreases. As a result, even N-gram techniques become unsatisfactory for the very small samples that typically occur in some applications, such as user input queries to Internet search engines.

As noted by Dunning, common word techniques are difficult or impossible to apply to languages in which tokenization into words is difficult (as in Chinese) or in which it is difficult to define a set of common words. Martino et al., on the other hand, argue that trigrams, N-grams, and other artificial divisions in a computerized text are not considered reliable and have limited success in identifying the correct language. A more general statement of this problem is that, in some contexts, N-gram techniques produce better results than word techniques, while in others, word techniques produce better results.

The invention is based on the discovery of a new technique for automatic language identification that alleviates these problems. The new technique automatically identifies a natural language that is likely to be the predominant language of a sample text. To do so, the new technique uses text data defining the sample text and probability data for each of a set of languages to automatically obtain, for each language in the set, sample probability data indicating a probability that the sample text would occur in the language. The new technique then uses the sample probability data to automatically obtain language identifying data. The language identifying data identify the language in the set whose sample probability data indicate the highest probability.

In the new technique, the probability data for at least one language include N-gram probability data and the probability data for at least one language include word probability data. The N-gram probability data for a language indicate, for each of a set of N-grams, a probability that the N-gram occurs in a text if the language is the predominant language of the text. The word probability data for a language indicate, for each of a set of words, a probability that the word occurs in a text if the language is the predominant language of the text.

The new technique automatically obtains sample probability data for each of a subset of the languages that includes at least one language with N-gram probability data and at least one language with word probability data. The sample probability data of a language with N-gram probability data include information from the language's N-gram probability data and the sample probability data from a language with word probability data include information from the language's word probability data.

The new technique can be implemented with probability data for trigrams and with probability data for words of five characters or less. Sample probability data can be obtained for every language that has N-gram or word probability data. At least one language can have both N-gram and word probability data, and sample probability data for each such language can include information both from its N-gram probability data and its word probability data. At least one language can have only N-gram probability data.

In the case where a language has both N-gram and word probability data, the N-gram probability data and the word probability data can include a probability value for each N-gram or word, and the probability values can be used to obtain the language's sample probability data. The probability values can be logarithmic, so that probability values for each N-gram that occurs in the text sample can be added to obtain a total N-gram probability value and probability values for each word that occurs in the text sample can be added to obtain a total word probability value. A constant probability value indicating a low probability can be used for each N-gram or word for which a probability value is not included. The total probability values can then be combined, such as by adding and then dividing by two, to obtain a sample probability value for the language.

The new technique can further be implemented in a system that includes text data defining a sample text, probability data as described above, and a processor that uses the text data and probability data to automatically obtain sample probability data as described above. The processor then uses the sample probability data to automatically obtain language identifying data identifying the language whose sample probability data indicate the highest probability.

The new technique can also be implemented in an article of manufacture for use in a system that includes text data defining a sample text and a storage medium access device. The article can include a storage medium and probability data and instruction data stored by the storage medium. The system's processor, in executing the instructions indicated by the instruction data, uses the text data and the probability data to automatically obtain sample probability data as described above. The processor then uses the sample probability data to automatically obtain language identifying data.

The new technique can also be implemented in a method of operating a first machine to transfer data to a second over a network, with the transferred data including probability data and instruction data as described above.

In comparison with conventional techniques for automatically identifying language using only N-grams or using only words, the new technique is advantageous because it combines both approaches in a way that increases overall recognition accuracy without sacrificing the accuracy obtained by each approach separately for large samples. In particular, the new technique enjoys markedly increased accuracy for small samples, and can be successfully used for very small samples, such as user input queries to Internet search engines. The new technique also achieves increased accuracy even where smaller texts in each language are used to obtain N-gram and word probabilities.

The new technique is also advantageous where the set of languages being distinguished includes a pair of closely related languages that share most of their trigrams but have different function words, such as Spanish and Portuguese. In this context, the new technique provides the advantages of N-gram techniques, yet can distinguish the closely related languages based on word probability information.

The new technique is also advantageous because it can be readily extended to additional languages. Specifically, in comparison with conventional language identification techniques that use solely trigrams or other N-grams, the new technique can be more easily extended to additional languages because it does not produce larger confusion matrices as the conventional techniques do.

The new technique has proven to work well with a set of more than 30 languages, and adding more languages to the set does not reduce recognition accuracy for the languages that were already in the set. As a result, the new technique can be readily applied to newly available linguistic data, such as non-English text retrieved from the World Wide Web. The new technique has also is been successfully applied to a set that includes languages without distinguishable word boundaries or with multi-byte character sets, such as Chinese and Korean.

The following description, the drawings, and the claims further set forth these and other aspects, objects, features, and advantages of the invention.

BRIEF DESCRIPTION OF THE DRAWINGS

FIG. 7 is a table showing language identification results with different sample sizes using only trigram probability information.

FIG. 8 is a table showing language identification results with different sample sizes using both trigram and short word probability information.

DETAILED DESCRIPTION OF THE INVENTION

A. Conceptual Framework

Figure 1:
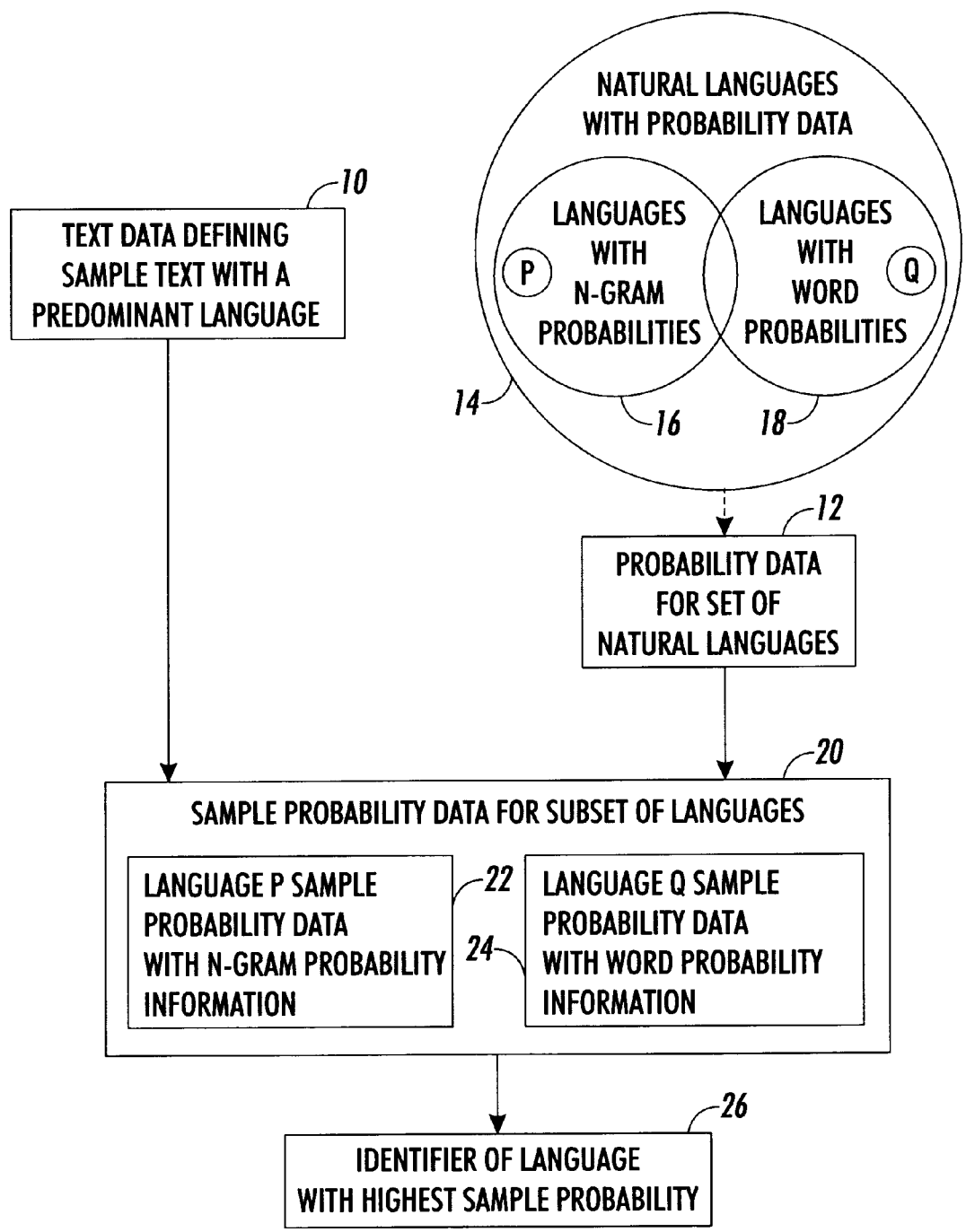
FIG. 1 is a schematic flow diagram showing how to identify a natural language that is likely to be the predominant language of a sample text.

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values". For example, a binary item of data, also referred to as a "bit", has one of two values, interchangeably referred to as "1" and "0" or "ON" and "OFF" or "high" and "low".

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of diskettes storing a single body of data would together be a storage medium.

A "storage medium access device" is a device that includes circuitry that can access data on a data storage medium. Examples include drives for accessing magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "data processor" or "processor" is any component or system that can process data, and may include one or more central processing units or other processing components.

A processor performs an operation or a function "automatically" when it performs the operation or function independent of concurrent human intervention or control.

Any two components are "connected" when there is a combination of circuitry that can transfer signals from one of the components to the other. For example, two components are "connected" by any combination of connections between them that permits transfer of signals from one of the components to the other.

A "network" is a combination of circuitry through which a connection for transfer of data can be established between machines. An operation "establishes a connection over" a network if the connection does not exist before the operation begins and the operation causes the connection to exist.

A processor "accesses" an item of data in memory by any operation that retrieves or modifies the item or information within the item, such as by reading or writing a location in memory that includes the item. A processor can be "connected for accessing" an item of data by any combination of connections with local or remote memory or input/output devices that permits the processor to access the item.

A processor or other component of circuitry "uses" an item of data in performing an operation when the result of the operation depends on the value of the item.

An "instruction" is an item of data that a processor can use to determine its own operation. A "processor" executes a set of instructions when it uses the instructions to determine its operations.

To "obtain" or "produce" an item of data is to perform any combination of operations that begins without the item of data and that results in the item of data. To obtain a first item of data "based on" a second item of data is to use the second item to obtain the first item.

An item of data "indicates" a thing, event, or characteristic when the item has a value that depends on the existence or occurrence of the thing, event, or characteristic can be obtained by operating on the item of data. An item of data "indicates" another value when the item's value is equal to or depends on the other value.

A first item of data "includes" information from a second item of data if the value of the first item of data depends on the information from the second item of data. For example, the second item of data can be used to obtain the first item of data in such a way that the value of the first item of data depends on the information.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

A "natural language" is an identified system of symbols used for human expression and communication within a community, such as a country, region, or locality or an ethnic or occupational group, during a period of time. Some natural languages have a standard system that is considered correct, but the term "natural language" as used herein could apply to a dialect, vernacular, jargon, cant, argot, or patois, if identified as distinct due to differences such as pronunciation, grammar, or vocabulary. The natural languages include ancient languages such as Latin, ancient Greek, ancient Hebrew, and so forth, and also include synthetic languages such as Esperanto and Unified Natural Language (UNL).

"Character" means a discrete element that appears in a written, printed, or phonetically transcribed form of a natural language. Characters in the present day English language can thus include not only alphabetic and numeric elements, but also punctuation marks, diacritical marks, mathematical and logical symbols, and other elements used in written, printed, or phonetically transcribed English. More generally, characters can include, in addition to alphanumeric elements, phonetic, ideographic, or pictographic elements.

A "character code" is an item of data that has a value indicating one of a set of characters. One set of one-byte character codes commonly used for English is referred to as ASCII, but there are many others, including supersets of ASCII such as ISO 8859-1 and Codepage 850 for Western European languages, two- and three-byte character codes for languages such as Chinese, and two- and four-byte versions of the UNICODE, a character code set that attempts to unify all character sets.

A "word" is a string of one or more elements, each of which is a character or a combination of characters, where the string is treated as a semantic unit in at least one natural language. Abbreviations, acronyms, contractions, misspellings, and other semantically meaningful variants are all words under this definition. A word "occurs" in each language in which it is treated as a semantic unit.

An "N-gram" usually means a series of N characters, but, where characters are indicated by character codes of unknown length, an N-gram can also mean a series of N bytes from a series of character codes. A "trigram" is an N-gram with N=3.

A "text" is a series of characters that forms a series of words. A text may be "defined", for example, by a written or printed series of characters or by an item of data that includes a series of character codes.

A text has a "predominant language" if the words formed by the characters of the text occur in a set of languages such that one language meets a criterion for predominance. For example, the criterion could be that more than half of the words occur in the predominant language and that less than half of the words occur in each of the other languages. Or the criterion could simply be that more of the words occur in the predominant language than in any other language. Or the criterion could be based on a special character approach, that compares the densities of special characters that are characteristic of each language—the predominant language has the highest density of its special characters. Or the criterion could be more subjective, based on the conclusion that would be reached by a human reader familiar with the languages in which the words of the text occur.

A text "occurs" in a language if the language is the predominant language of the text.

A probability that a text "would occur" in a language is a value obtained from incomplete information about the text, where the same incomplete information could come from a number of texts referred to as a "text population", and where the value indicates the proportion of the text population that have the language as their predominant language. Because a proportion of any text population will be between zero and one, the term "probability" often refers only to a value between zero and one that indicates a probability, but the term "probability" can also include one of a set of other values to which the values between zero and one can be mapped, such as integers or logarithms of the values between zero and one, and can also indicate approximations of probability obtained in various ways. A probability value is "logarithmic" if it indicates probability based on a mapping from the values between zero and one to their logarithms or, as is often more convenient, to the magnitudes of their logarithms, since all logarithmic probability values are negative. Logarithmic probability values are often useful because they preserve information about the relationship between probabilities, yet provide greater numerical stability and computational efficiency.

A "low probability" is a probability value that indicates a probability near zero. Since logarithms of probabilities go to negative infinity as probabilities approach zero, logarithmic probability values, e.g. log(p) or —log(p), will be low if they have large magnitudes, in this case |log(p)| for both.

Similarly, a probability that an N-gram or words "occurs" in a text if a language is the predominant language of the text is a value obtained from incomplete information about texts that include the N-gram or word and that have the language as their predominant language, where the same incomplete information could come from texts that include the N-gram or word and have any of a number of languages as their predominant language, referred to as an "including text population", and where the value indicates the proportion of the including text population that have the language as their predominant language.

An operation "combines" values if it produces an item of data that includes information from the values. For example, values can be combined into a vector or by obtaining a linear combination, i.e. a weighted or unweighted sum; a weighted or unweighted product; a weighted or unweighted arithmetic or geometric mean; or, for a large number of values, another characteristic of their distribution such as a mode or median or even a measure of variance.

B. General Features

Figure 2:
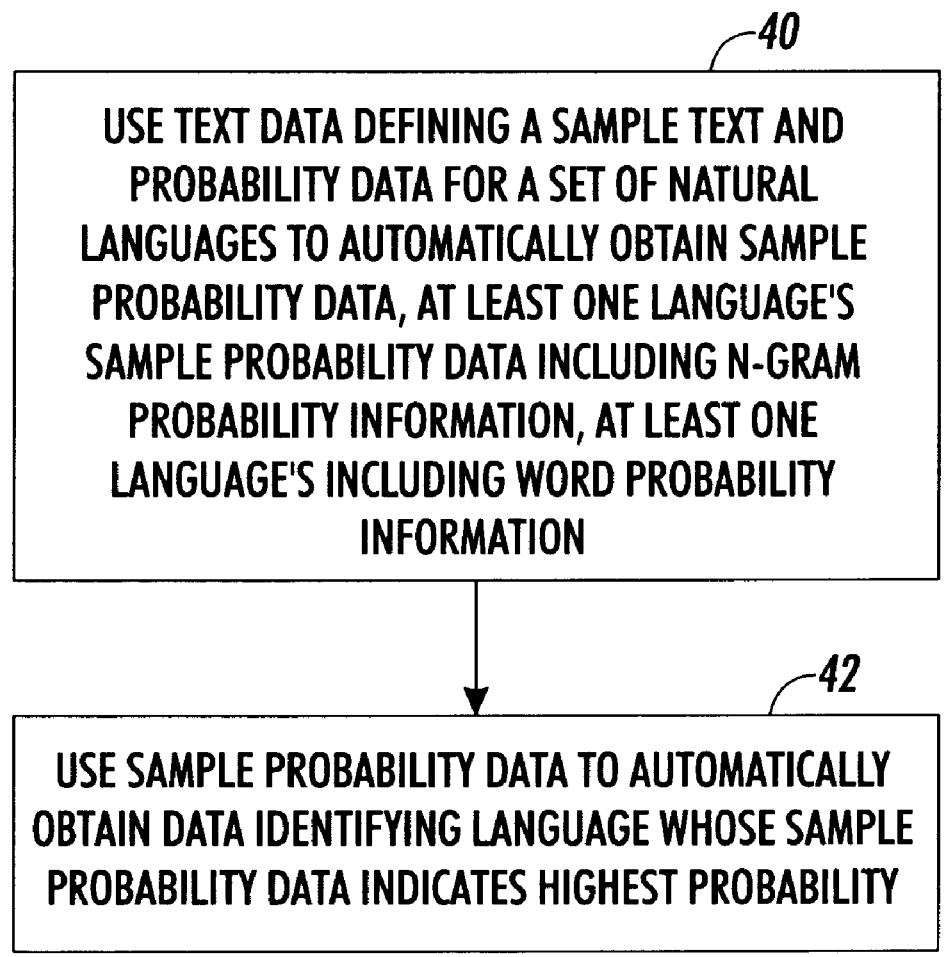
FIG. 2 is a flow chart showing general acts in identifying a language that is likely to be the predominant language of a sample text.
Figure 3:
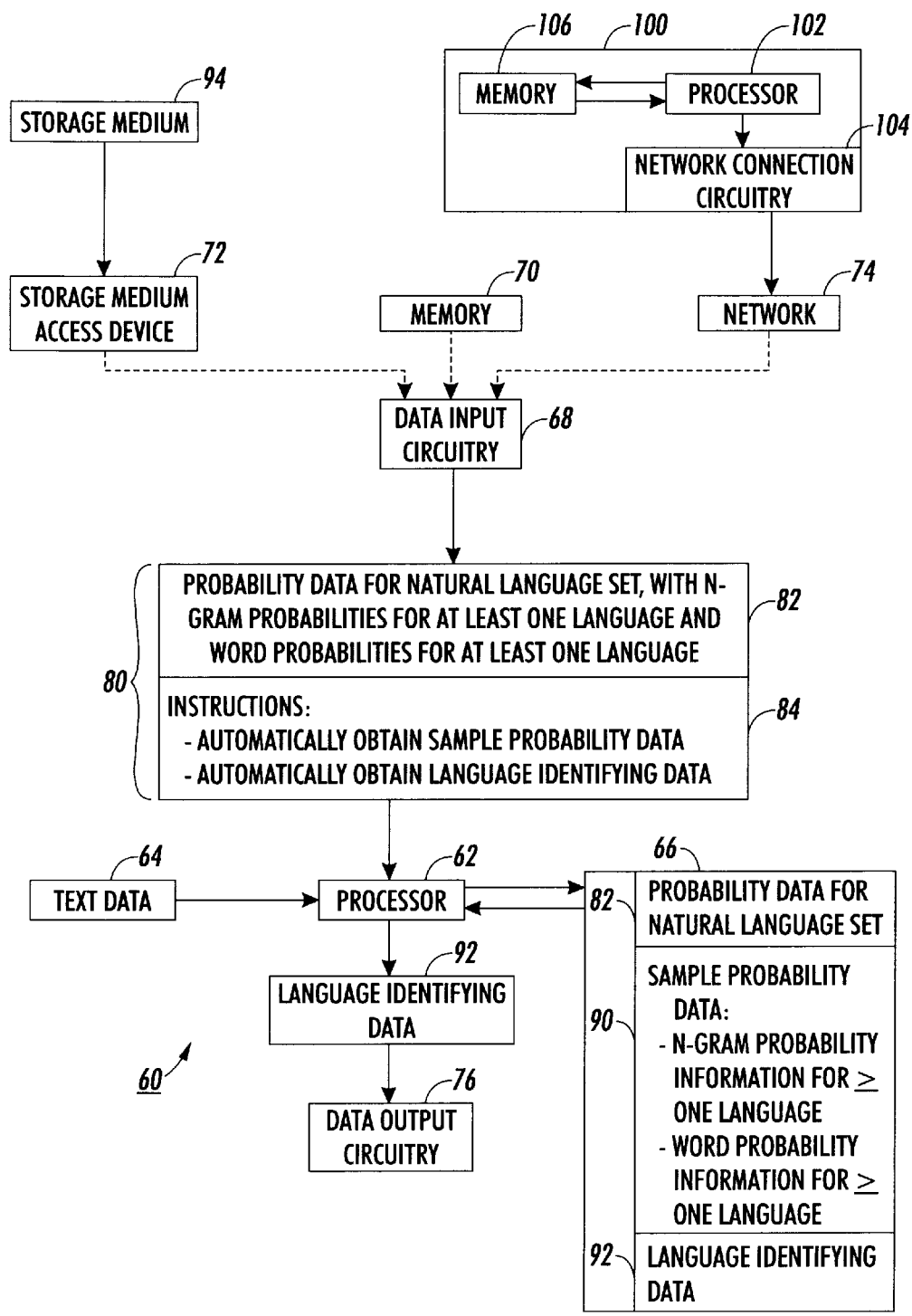
FIG. 3 is a schematic diagram showing components of a system that can perform the general acts in FIG. 2.

FIGS. 1–3 illustrate general features of the invention.

FIG. 1 is a flow diagram that shows schematically how to identify a natural language that is likely to be the predominant language of a sample text.

Text data 10 define a sample text that has a predominant language. Probability data 12 indicate probabilities for each of a set of natural languages. Set diagram 14, illustratively connected to probability data 12 by a dashed line, illustrates the nature of the probability data for some of the languages. The outer perimeter of set diagram 14 represents the full set of natural languages for which probability data 12 indicate probabilities. Within the outer perimeter are inner perimeters 16 and 18, representing first and second subsets of the languages, respectively.

The first subset includes languages for which probability data 12 include N-gram probability data. The N-gram probability data for each language in the first subset indicate, for each of a set of N-grams, a probability that the N-gram occurs in a text if the language is the predominant language of the text. The first subset illustratively includes a language designated P and shown in a small circle within perimeter 16.

The second subset includes languages for which probability data 12 indicate word probabilities. The word probability data of each language in the second subset indicate, for each of a set of words, a probability that the word occurs in a text if the language is the predominant language of the text. The second subset illustratively includes a language designated Q and shown in a small circle within perimeter 18.

As suggested in set diagram 14, the first and second subsets may overlap, with some languages having both N-gram probabilities and word probabilities, and there may be some languages that are in neither of the first and second subsets, but have another type of probability data.

Text data 10 and probability data 12 are used to automatically obtain sample probability data 20, indicating sample probabilities for each of a third subset of the languages. The third subset includes at least one language from each of the first and second subsets, illustratively languages P and Q. Language P's sample probability data 22 include information from the N-gram probability data for language P. Language Q's sample probability data 24 include information from the word probability data for language Q.

FIG. 1 also shows that sample probability data 20 are used to automatically obtain language identifying data 26. Language identifying data 26 identify the language in the third subset whose sample probability data indicate the highest probability.

In box 40 in FIG. 2, a technique uses text data defining a sample text and probability data for each of a set of natural languages to automatically obtain, for each of at least two languages in the set, sample probability data indicating a probability that the sample text would occur in the language. The probability data for each of a first subset of the languages include N-gram probability data indicating, for each of a set of N-grams, a probability that the N-gram occurs in a text if the language is the predominant language of the text. The probability data for each of a second subset include word probability data indicating, for each of a set of words, a probability that the word occurs in a text if the language is the predominant language of the text. The technique automatically obtains the sample probability data for each of a third subset of the languages. At least one language in the third subset is also in the first subset and its sample probability data include information from the language's N-gram probability data. At least one language in the third subset is also in the second subset and its sample probability data include information from the language's word probability data.

In box 42, the technique uses the sample probability data to automatically obtain data identifying the language whose sample probability data indicate the highest probability.

Machine 60 in FIG. 3 includes processor 62 connected for obtaining text data 64 defining a sample text and also connected for accessing data in memory 66. Processor 62 is also connected for receiving data through data input circuitry 68, which can illustratively provide data received from connections to memory 70, storage medium access device 72, or network 74. Processor 62 is also connected for providing data through data output circuitry 76, which could provide data through connections to components similar to those from which data input circuitry 68 can receive data. Processor 62 therefore could be the central processing unit (CPU) of a personal computer, workstation, or server, or any other processing device capable of operating as described below.

Text data 64 could be obtained from any appropriate source, including user input circuitry (not shown), memory 66, or data input circuitry 68. If processor 62 is a server, for example, text data 64 could be received from a client machine through network 74 and data input circuitry 68, and results could similarly be provided to the client machine through data output circuitry 76 and network 74.

Body of data 90 illustratively provided by data input circuitry 68 includes probability data 82 and instruction data 84. Probability data 82 indicate probabilities for a set of natural languages. Probability data 82 include, for each of a first subset of the languages, N-gram probability data indicating, for each of a set of N-grams, a probability that the N-gram occurs in a text if the language is the predominant language of the text. Probability data 82 also include, for each of a second subset of the languages, word probability data indicating, for each of a set of words, a probability that the word occurs in a text if the language is the predominant language of the text.

In executing the instructions indicated by instruction data 84, possibly after loading probability data 82 into memory 66, processor 62 automatically obtains sample probability data 90 and language identifying data 92. More specifically, processor 62 can use text data 64 and probability data 82 to automatically obtain sample probability data 90. Sample probability data 90 can indicate, for each of a third subset of the languages, a probability that the sample text would occur in the language. For at least one language in the third subset that is also in the first subset, sample probability data 90 include information from the language's N-gram probability data. For at least one language in the third subset that is also in the second subset, sample probability data include information from the language's word probability data. Then, processor 62 uses sample probability data 90 to automatically obtain language identifying data 92, which identify the language whose sample probability data indicate the highest probability.

As noted above, FIG. 3 illustrates three possible sources from which data input circuitry 68 could provide data to processor 62—memory 70, storage medium access device 72, and network 74.

Memory 70 could be any conventional memory within machine 60, including random access memory (RAM) or read-only memory (ROM), or could be a peripheral or remote memory device of any kind.

Storage medium access device 72 could be a drive or other appropriate device or circuitry for accessing storage medium 94, which could, for example, be a magnetic medium such as a set of one or more tapes, diskettes, or floppy disks; an optical medium such as a set of one or more CD-ROMs; or any other appropriate medium for storing data. Storage medium 94 could be a part of machine 60, a part of a server or other peripheral or remote memory device, or a software product. In each of these cases, storage medium 94 is an article of manufacture that can be used in a machine.

Network 74 can provide a body of data from machine 100. Processor 102 in machine 100 can establish a connection with processor 62 over network 74 through network connection circuitry 104 and data input circuitry 68. Either processor could initiate the connection, and the connection could be established by any appropriate protocol. Then processor 102 can access a body of data stored in memory 106 and transfer the body of data to processor 62 over network 74. Processor 62 can store the body of data in memory 66 or elsewhere, and can then execute the instructions to perform automatic language identification.

FIG. 3 also illustrates that processor 62 can provide language identifying data 92 as output through data output circuitry 76, such as to a user.

C. Implementation

The general features described above could be implemented in numerous ways on various machines to identify word groups using query words. An implementation described below has been implemented on a Sun SPARCstation Ultra 2 workstation running Solaris 2.4.x and executing code compiled from ANSI C source code.

C.1. System

Figure 4:
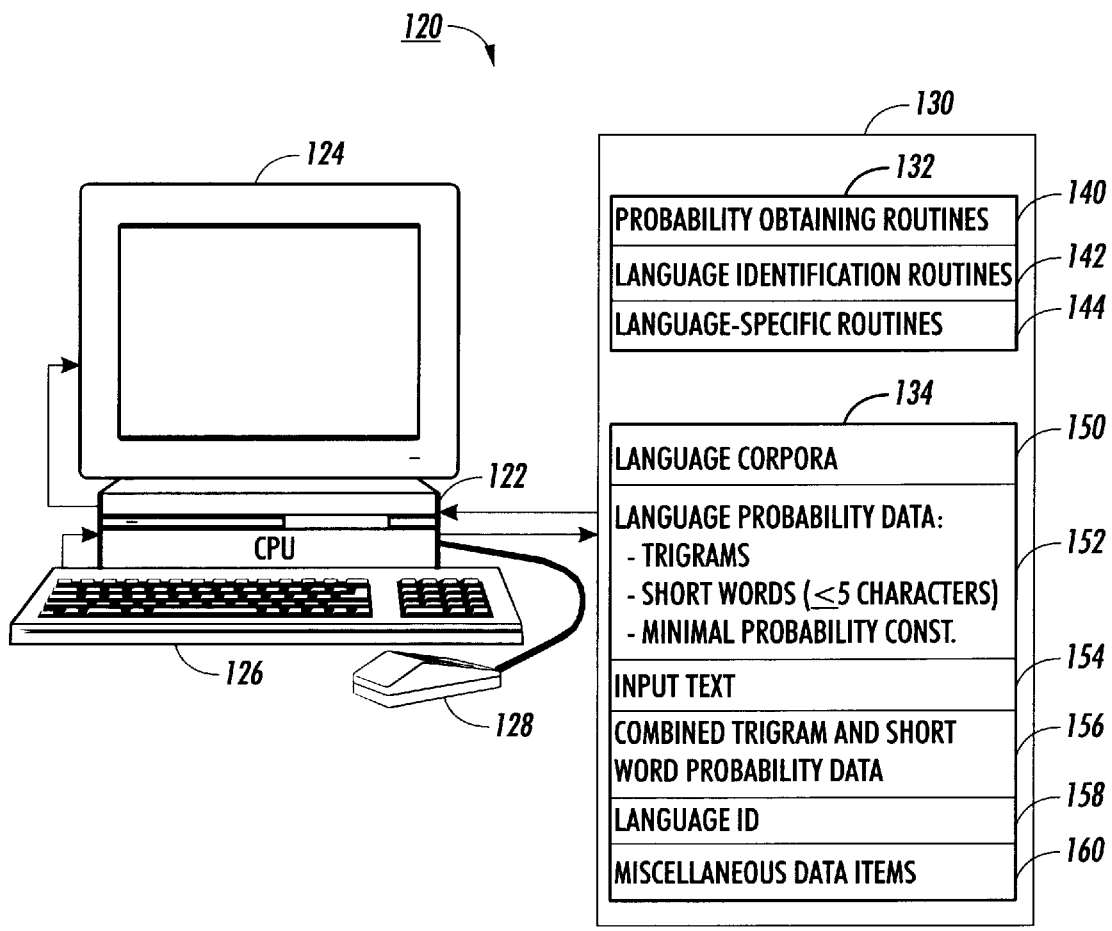
FIG. 4 is a schematic diagram of a system in which the general acts in FIG. 2 have been implemented.

In FIG. 4, system 120 includes the central processing unit (CPU) 122 of a Sun SPARCstation Ultra 2 workstation, which is connected to display 124 for presenting images and to keyboard 126 and mouse 128 for providing signals from a user. CPU 122 is also connected so that it can access memory 130, which can illustratively include program memory 132 and data memory 134.

The routines stored in program memory 132 can be grouped into several functions-probability obtaining routines 140, language identification routines 142, and language-specific routines 144, which could be any routines that are called with a language identifier or that are otherwise specific to a language. FIG. 4 also shows several items of data stored in data memory 134 and accessed by CPU 122 during execution of routines in program memory 132—language corpora 150; language probability data 152; input text 154; combined trigram and short word probability data 156; language identifier (ID) 158; and miscellaneous data items 160, some of which are described below.

In executing probability obtaining routines 140, processor 122 can use language corpora 150 to obtain language probability data 152, which include probability data for each of a set of natural languages. Language probability data 152 can include trigram probability data for some languages, short word probability data for some languages, and both types of probability data for some languages. Language probability data 152 are therefore an implementation of probability data 82 in FIG. 3. The short word probability data can be for words of five characters or less, for example. Language probability data 152 can also include a minimal probability constant that is used for trigrams and short words for which probabilities are not otherwise indicated; alternatively, a minimal probability constant could be provided as a parameter within language identification routines 142.

In executing language identification routines 142, processor 122 can use input text 154 and language probability data 152 to automatically obtain combined trigram and short word probability data 156. Combined probability data 156 can indicate, for each language, a probability that input text 154 would occur in the language, combining information about trigram and word probabilities. Therefore, combined probability data 156 are an implementation of sample probability data 90 in FIG. 3.

Further, in executing language identification routines 142, processor 122 can use combined probability data 156 to automatically obtain language ID 158. Language ID 158 can indicate the language for which combined probability data 156 indicate the highest probability. Language ID 158 is therefore an implementation of language identifying data 92 in FIG. 3.

In executing language-specific routines 144, processor 122 can provide language ID 158 as part of a call to a routine or can call a routine that is appropriate for the language identified by language ID 158.

Probability obtaining routines 140 and language identification routines 142 can be implemented as described below. Language-specific routines 144 can include a wide variety of routines that are best performed for a specific language. Some examples are described below in relation to applications of the invention.

C.2. Natural Language Probability Data

Figure 5:
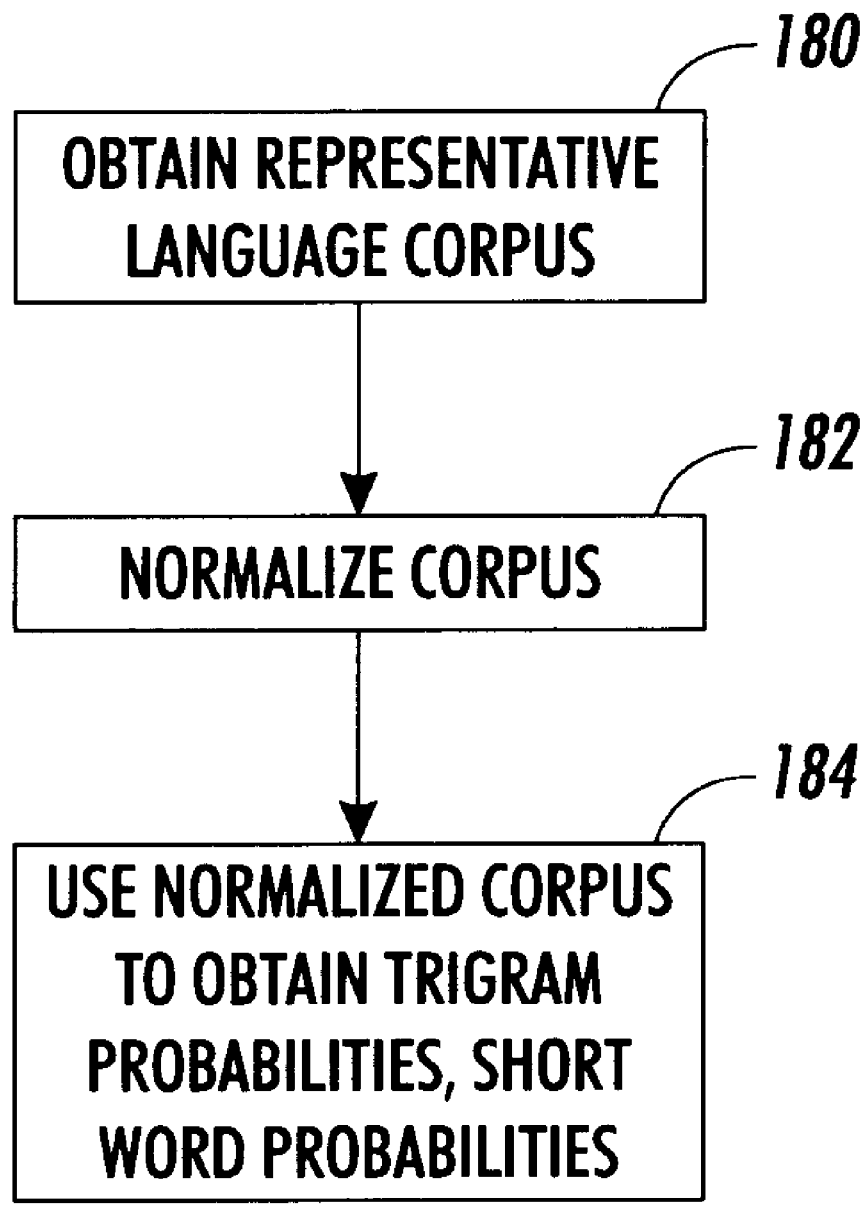
FIG. 5 is a flow chart showing how the system of FIG. 4 can obtain natural language probability data.

FIG. 5 illustrates general acts performed by processor 122 in executing probability obtaining routines 140 in the implementation of FIG. 4. Probability data for a set of natural languages could be obtained in various other ways, examples of which are mentioned below, but the technique in FIG. 5 has been successfully implemented.

The acts in FIG. 5 obtain probability data for one natural language. The act in box 180 in FIG. 5 begins by obtaining a representative corpus of text for the language. In one implementation, a corpus of about 1 megabyte (MB) was obtained for each language. The act in box 180 can obtain representative text from a variety of sources, including corpora available from the European Corpus Initiative (ECI) through the European Network on Language and Speech (ELSNET) such as ECI/MCI (Multilingual Corpus I), corpora available from the Text Retrieval Conference (TREC) conducted by NIST and sponsored by DARPA, public domain text available from web sites, and so forth. Some such texts are contaminated, meaning that a text that is predominantly in one language also includes portions that are from other languages-the act in box 180 can therefore also include reviewing and manually deleting portions from other languages.

The act in box 182 normalizes the corpus from box 180. In this context, to normalize means to remove other types of contamination or noise and to change elements in the corpus so that it includes fewer different trigrams and short words. For example, normalization in box 182 can include simple tokenization to transform a stream of codes into single-word tokens; removal of text markup codes, such as HTML tags; deletion of codes for non-alphabetical characters, such as special characters and numbers, retaining only language-characteristic characters such as apostrophes and hyphens; and mapping all characters to lower case in a default character set such as ISO 8859-1. Normalization could also include deletion of meta-language, such as copyright notices on Web pages (which can inappropriately affect results because they are usually in English). After normalization, the normalized corpus should include a sequence of tokens, i.e. words delimited by single space characters.

Mapping all characters to lower case reduces the number of trigrams and short words in each language, and leads to more robust language identification because some text sources, such as web pages and Usenet news, often contain capitalized words. Since the language and character set are not known, this mapping can be done to a default character set, as noted above. Experimental results indicate that mapping to lower case improves accuracy in all languages except German and Lithuanian, in which accuracy decreased slightly.

Various other combinations of operations could be used to implement normalization in box 182.

Generally, language-independent normalization can be performed automatically with conventional linguistic tools that have been developed for major languages but can be applied to other languages. In some cases, such as for Chinese, Korean, and Hebrew, it may be appropriate to review and manually modify automatically normalized text, bearing in mind that normalization will be performed automatically during language identification, and before a predominant language has been identified. For example, English, French, and German words can be manually removed from the corpus for another language.

The act in box 184 uses the normalized corpus from box 182 to obtain trigram probabilities and short word probabilities. In one implementation, trigram probabilities are obtained first, then short word probabilities.

Trigram probabilities can be obtained by counting the number of occurrences of each trigram in the normalized corpus from box 182. To count trigram occurrences, a routine can go through the normalized corpus until it reaches the end of a token, which should be a normalized word. The routine can then add the boundary marker "_" before and after the token to obtain a string that includes one trigram for each character of the token. The routine can then compare each trigram with trigrams already found to obtain a trigram identifier; if the trigram does not match any of the trigrams that have already been found, the routine can assign a new identifier to the trigram. The routine can use the trigram's identifier to access an array of trigram counts, and can increment the count for the trigram's identifier in the array.

When frequency counts have been obtained, each trigram's frequency count from the array can be compared with a minimum count to determine whether to discard the trigram, thus thresholding or smoothing the trigram distribution. If the frequency count exceeds the minimum count, the frequency count can be divided by the total number of trigrams counted to obtain a probability between zero and one. This or other maximum likelihood estimation (MLE) techniques or the like could be used to obtain an approximate probability for a trigram. In any case, the logarithm of the probability can then be obtained and saved as a probability value for the trigram.

Short word probabilities can similarly be obtained by counting the number of occurrences of each short word in the normalized corpus from box 182. To count short word occurrences, a routine can go through the normalized corpus until it reaches the end of a token, which should be a normalized word. The routine can then determine whether the word is a short word based on its length—a maximum short word length of five characters has been successfully implemented. The routine can then compare each short word with short words already found to obtain a short word identifier; if the short word does not match any of the short words that have already been found, the routine can assign a new identifier to the short word. The routine can use the short word's identifier to access an array of short word counts, and can increment the count for the short word's identifier in the array.

When frequency counts have been obtained, the array can be scanned to obtain a limited number, such as one hundred, of the most frequent short words, based on the frequency counts in the array. If a short word is one of the most frequent short words, its frequency count can be divided by the total number of short words counted to obtain a probability between zero and one. Alternatively, maximum likelihood estimation (MLE) techniques could be used to obtain an approximate probability for a short word. In either case, the logarithm of the probability can then be obtained and saved as a probability value for the short word.

Converting probabilities to logarithmic magnitudes significantly reduces the memory required to store probability data. Further reductions might be obtained by converting the logarithmic magnitudes to integers.

The technique in FIG. 5 can be viewed as training a statistical model for a language classifier. Once the statistical model is trained, it can be used to perform language classification and, more specifically, language identification.

C.3. Language Identification

Figure 6:
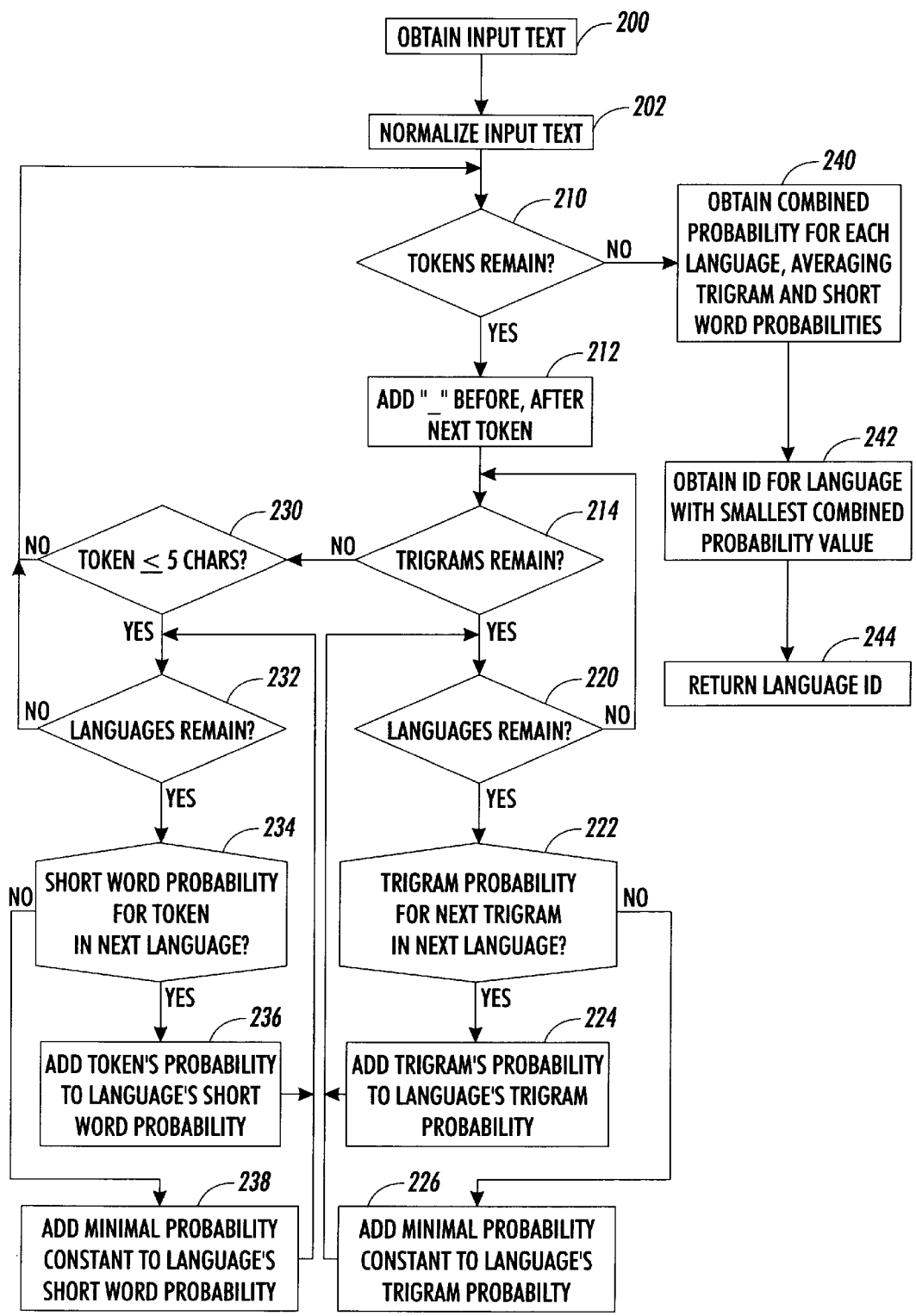
FIG. 6 is a flow chart showing how the system of FIG. 4 implements acts as in FIG. 2.

FIG. 6 illustrates in detail acts that can be performed by processor 122 in executing language identification routines 142.

The act in box 200 begins by obtaining input text 154. The act in box 202 then normalizes the input text in the same way that normalization was automatically performed in box 182 in FIG. 5.

The act in box 210 then begins an outer iterative loop, each iteration of which handles a token from the normalized input text from box 202. The outer iterative loop first obtains trigram probabilities, then short word probabilities.

To obtain trigram probabilities, the act in box 212 begins by adding the character "_" before and after the next token. The acts in boxes 214 and 220 then begin a first inner iterative loop that handles each trigram for each language being considered. The act in box 222 begins the first inner iterative loop by determining whether the next trigram has a trigram probability in the next language. If so, the act in box 224 adds the trigram's probability to the language's trigram probability, but if not, the act in box 226 adds the minimal probability constant to the language's trigram probability.

The act in box 230 tests whether the token (without the "_" characters added in box 212) has five characters or less. The act in box 232 then begins a second inner iterative loop that handles each language being considered. The act in box 234 begins the second inner iterative loop by determining whether the token has a short word probability in the next language. If so, the act in box 236 adds the short word probability to the language's short word probability, but if not, the act in box 238 adds the minimal probability constant to the language's short word probability.

In relation to boxes 226 and 238, since logarithmic magnitudes of probabilities are being used, the minimal probability constant should have a relatively large value, to indicate a probability slightly greater than zero. Also, the occurrence of each trigram and of each short word is considered to be an independent probability event in relation to other trigrams and short words, respectively, which is why it is valid to multiply (by adding logarithms of) probabilities. Experiments have not shown improvement from weighting trigrams that start and end words more heavily than other trigrams When the outer iterative loop has been completed for all tokens in the input text, the act in box 240 obtains a combined trigram and short word probability for each language, obtaining the sum or a linear combination of trigram and short word probabilities for languages that have both. If a language does not have short word probabilities, as is the case for Chinese in the current implementation, the combined probability can simply be the language's trigram probability. The act in box 240 thus produces combined trigram and short word probability data 156 in FIG. 4. The acts in FIG. 6 that culminate in box 240 also illustrate an implementation of the act in box 40 in FIG. 2, and can be implemented by executing instructions that automatically obtain sample probability data as shown in box 84 in FIG. 3.

The act in box 242 then obtains a language ID of the language that has the lowest combined probability value from box 240, because the probability values are derived from logarithmic magnitudes of probabilities, so that a larger probability value indicates a smaller probability. The act in box 242 can be implemented by comparing to find the language with the smallest combined probability value. The act in box 242 thus produces language ID 158 in FIG. 4, and also illustrates an implementation of the act in box 42 in FIG. 2, which can be implemented by executing instructions that automatically obtain language identifying data as shown in box 84 in FIG. 3.

Finally, the act in box 244 returns the language ID from box 242, thus completing language identification.

In addition to the features explicitly shown in FIG. 6, the implementation can be set to perform language identification in a trigram mode based solely on trigram probabilities and in a short word mode based solely on short word probabilities. In other respects, the trigram and short word modes are the same as the combined trigram and short word technique shown in FIG. 6.

C.4. Results

The implementation described above has been tested by initially training with approximately 1 MB of text for each language, and by then using a different (disjoint) 1 MB of text for each language as a test bed for language identification. In each case, the test bed texts were manually cleaned to remove contamination, as described above in relation to box 180 in FIG. 5. Several different experimental results were obtained.

One result is that language identification based on both trigram probability information and short word probability information is, on average, more accurate than trigrams alone or short words alone, and that identification based on trigrams alone is, on average, more accurate than short words alone. This result was obtained by comparing the combined trigram and short word mode shown in FIG. 6 with the trigram mode and the short word mode mentioned above.

In the experiment, language identification was performed in all three modes for texts in nine languages—Dutch, English, Finnish, French, German, Italian, Portuguese, Spanish, and Swedish. A simple heuristic was used to divide each test text into sentences of at least five words, and language identification was performed on every sentence to obtain, for each language, a ratio of correctly identified sentences to the total number of sentences in the test text of the language. These ratios were then averaged over all the languages for each language identification mode, to obtain the following average accuracies:

Trigram mode—98.8%; short word mode—96.4%; combined mode—99.8%.

It is suspected that the combined mode may result in increased accuracy because using both trigram probability information and short word probability information avoids errors that would arise using either type of information alone. In other words, ambiguities that might occur with trigram information only are resolved by short word information and vice versa. This suggests an unexpected difference between the information provided by trigram probabilities and by short word probabilities, a difference that is exploited by the invention to produce improved accuracy and other benefits.

Another, more surprising result is that the combined trigram and short word mode is significantly better than the trigram mode for small sets of words. The above experiment was modified by performing language identification on random samples of single words, word pairs, etc., up to sequences of 20 words, each sample including 1000 elements. FIG. 7 is a table showing results in the trigram mode for illustrative word sequence sizes. FIG. 8 is a table showing results in the combined trigram and short word mode and, in the last row, the improvement, calculated by dividing the difference between the mean results for the two modes by the mean result for the trigram mode at each word sequence size. As can be seen, there was not a measurable improvement for sequences of 20 words, but, remarkably, for single words, the combined mode provided more than 25% improvement from the trigram mode.

The improvement in error rates for relatively short word sequences is especially impressive: As can be seen, for example, from the column for sequences of five words in FIGS. 7 and 8, the trigram mode has an error rate of 2.9% (i.e. 100% minus 97.1% accuracy), while the combined trigram and short word mode has a much lower error rate of 1.0% (i.e. 100% minus 99.0% accuracy), nearly two-thirds less. The columns for sequences of three, four, six, and ten words show comparably large proportional reductions in error rates, while the columns for one, two, and fifteen word sequences show smaller proportional reductions, and the columns for twenty word sequences show no reduction at the illustrated level of precision.

Figure 9:
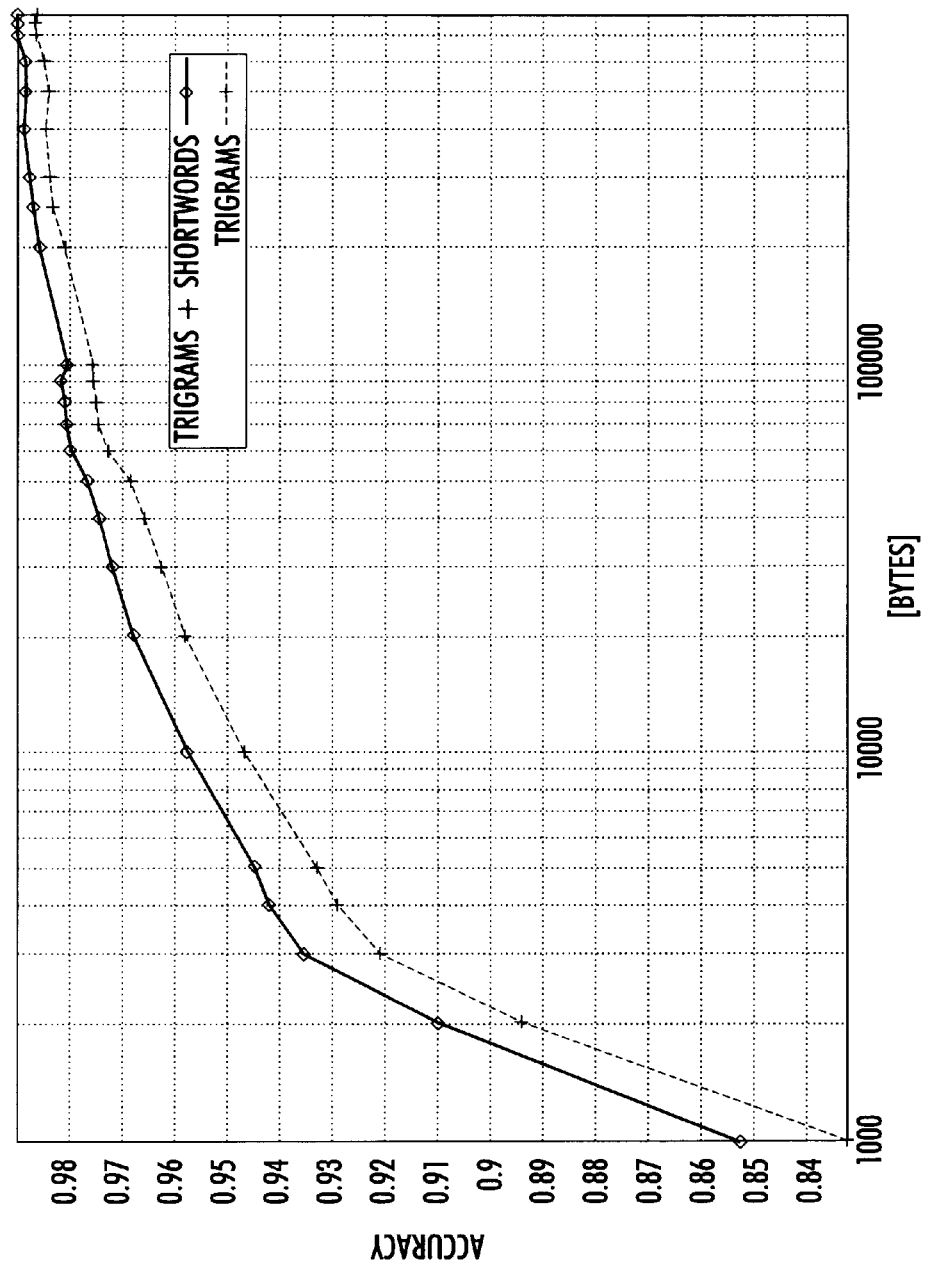
FIG. 9 is a graph comparing language identification results for trigram only and combined trigram and short word modes across a range of training sample sizes.

A more subtle result is that the combined mode attains higher accuracy than the trigram mode when trained with relatively small samples. This result was obtained by training the two modes with samples from the same nine languages used above, with the training samples ranging from 1000–800,000 bytes. FIG. 9 is a graph showing the average accuracy as a function of training sample size in bytes. As shown, average accuracy for the combined mode is consistently higher than for the trigram mode, though the accuracies tend to converge as sample size increases.

The combined mode can also be extended to additional languages. The number of languages was extended from 9 to 31 by adding Bulgarian, Croatian, Czech, Danish, Esperanto, Estonian, Greek, Hebrew, Hungarian, Icelandic, Indonesian, Irish, Latin, Lithuanian, Norwegian, Polish, Romanian, Russian, Slovakian, Slovenian, Swahili, and Turkish. Despite the increased number of languages and the variations in character sets, an overall accuracy of 98.9% was obtained.

The combined mode can also be extended to languages such as Chinese and Korean, using character sets with more than one byte per character and without a way to detect word boundaries. In these languages, short words cannot be isolated, so that only trigram probability information can be obtained, and each trigram may, for example, include 1.5 characters if each character code has two bytes. But the combined mode makes it possible to compare a probability value based on trigram probability information for Chinese or Korean with probability values for other languages based on both trigram and short word probability information. The language identification accuracy obtained for Chinese text was 99.8% and for Korean text was 99.1%, while the accuracy for identification of other languages was not adversely affected.

C.5. Variations

The implementations described above could be varied in many ways within the scope of the invention.

The implementations described above have been successfully executed on Sun SPARCstation Ultra 2 workstations, but implementations could be executed on other machines. The implementations described above have been successfully executed using the ANSI C programming environment on Sun SPARCstation Ultra 2, Solaris 2.4.x platform, but other programming environments and platforms could be used.

The implementations described above identify specified groups of languages, but the evidence available indicates that the invention could be successfully applied to character codes for any other group of natural languages. Further, the invention could be applied to any set of character codes, including, for example, multi-byte character codes for languages such as Chinese. For example, in a language with two byte character codes, each trigram could in effect include one whole character and one half of the following character or, conversely, one half of a character and the whole next character.

The implementations described above employ trigram probability information and information for words of five characters or less, but the invention could easily be implemented for N-grams of other lengths and for words of other lengths or to other sets of words that are easily extracted from text and are useful in distinguishing languages. Word length is used in the above implementations as an easy criterion that approximates the distinction between frequent and infrequent words, and also approximates the distinction between function words that are characteristic of a language and other words that are less characteristic. Function words are words with grammatical semantics and syntactic and structural functions, such as determiners, pronouns, prepositions, conjunctions, and particles. Therefore, the invention could instead be implemented by comparing every word in a sample text with a list of the n most frequent words in each language or with a list of the function words of each language. In addition, if it were discovered that an additional probability measure is beneficial in identifying language of a text sample, that measure could be integrated into the implementations described above by appropriately combining it with trigram and short word probabilities.

The implementations described above use overlapping trigrams, but the invention could be implemented with non-overlapping trigrams.

Furthermore, the invention could be implemented with random sampling of tokens, words, and N-grams rather than exhaustively considering all tokens, words, and N-grams in a sample text.

The implementations described above calculate trigram and short word probabilities in specified ways and add logarithms of probabilities of each type in order to obtain total probabilities that are then combined, but any other appropriate probability calculations could be used. For example, rather than adding logarithms of probabilities, the probability values themselves could be multiplied, although adding the logarithms is significantly faster and arithmetically more stable than multiplying the probability values because it avoids number overflow and truncation errors. Or the logarithms could be mapped to integers, which could be even more efficient and require even less memory space. Also, the implementations described above use a minimal probability constant, but more than one such constant could be used or a value could be obtained algorithmically, for example. For example, a different constant could be obtained for each language, such as by automatically deriving the constant from operations on training data or test data. Also, it may be possible to combine probability values in such a way that it is not necessary to add a minimal probability constant for trigrams and short words that do not have probability values, such as by dividing each sum of logarithms by the number of values that were added to reach it.

The implementations described above do not take character set into account, but the invention could easily be implemented to consider character set. In fact, in an implementation prepared for inclusion in a version of the Xerox Linguistic Development Architecture (XeLDA), features of which are described in copending, coassigned U.S. patent application Ser. No. 09/XXX,XXX (Attorney Docket No. R/98026), entitled "Executable for Requesting a Linguistic Service" and incorporated herein by reference, this approach has been taken.

In the implementations described above, acts are performed in an order that could be modified in many cases. For example, in FIG. 5, normalized corpora could be obtained for several languages, and the act in box 184 could then be performed for each language. Also, rather than obtaining trigram probabilities first, then short word probabilities, the order could be reversed. Similarly, rather than obtaining each token's trigrams and short words before handling the next token, one type of probabilities could be obtained for all the words in the text, then the other type, or the two types could be obtained in parallel somehow.

More generally, because the N-gram probabilities and the short word probabilities are independent from each other and do not interact, they can be calculated in any arbitrary fashion without loss of information. They could, for example, be calculated in parallel, either with parallel processors or on a serial processor with parallel calculations obtained by multi-tasking or multiple thread techniques. In such an implementation, combining the N-gram and short word probabilities could act as a synchronization of the parallel calculations.

The implementations described above use currently available computing techniques, but could readily be modified to use newly discovered computing techniques as they become available.

D. Applications

The invention can be applied in a linguistic system like XeLDA, to identify language of text for which the predominant language is not known before performing a language-specific linguistic service on the text. In XeLDA, for example, a request for a linguistic service can be sent over a network to a server, which performs language identification in accordance with the invention if the language of an input text is not specified. More generally, the invention can be applied before determining how to perform stemming, term expansion, translation, gisting, language-based filtering of documents obtained by information retrieval, or any of a wide variety of other language-specific services, many of which are mentioned in the application incorporated by reference above.

Specifically, the invention could be applied in support of search engines that employ language-specific linguistic operations such as stemming, translation, and phrase recognition to queries. The URL of a prototype search engine of this type is http://www.rxrc.xerox.com/research/mltt/Tools/CLIR.html. The invention is especially well suited to identify the language of a search engine query because, as discussed above, it can be implemented to obtain superior language identification for short sequences of words, and most queries are short. The search engine could, for example, automatically identify the language of a query, translate the query into one or more other languages, and perform its search/retrieval operation in the translated languages.

The invention can be applied to improve optical character recognition (OCR) by making it possible to perform language-specific OCR. First, word segmentation could be performed using conventional techniques on a scanned image of text. Then, character set identification, character segmentation, and character identification could be performed, again using conventional techniques or more sophisticated techniques that become available in future. The invention could then be applied to the results of character recognition, and the identified language could then be used to select the appropriate lexicon in which to perform word recognition, for use in post processing the raw results of character recognition.

The invention could also be applied as a language guesser, to which a user could submit text to determine its language. This application has also been implemented through a Web site to which users could submit text and from which a user would then receive language identification in response. The URL of the Web site is http://www.xrce.xerox.com/research/mltt/Tools/guesser.html.

E. Miscellaneous

The invention has been described in relation to software implementations, but the invention might be implemented with specialized hardware.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method of automatically identifying a natural language that is likely to be the predominant language of a sample text, the method including:

(A) using text data defining the sample text and probability data for each of a set of natural languages to automatically obtain, for each of at least two languages in the set, sample probability data indicating a probability that the sample text would occur in the language; and (B) using the sample probability data to automatically obtain language identifying data; the language identifying data identifying the language whose sample probability data indicate the highest probability;

the probability data for each of a first subset that includes one or more of the languages including N-gram probability data and the probability data for each of a second subset that includes one or more of the languages including word probability data; the N-gram probability data for each language in the first subset indicating, for each of a set of N-grams, a probability that the N-gram occurs in a text if the language is the predominant language of the text; the word probability data of each language in the second subset indicating, for each of a set of words, a probability that the word occurs in a text if the language is the predominant language of the text;

in which (A) includes:

(A1) automatically obtaining sample probability data for each of a third subset of the languages; for at least one language that is in the third subset and in the first subset, the sample probability data including information from the language's N-gram probability data; for at least one language that is in the third subset and in the second subset, the sample probability data including information from the language's word probability data.

2. The method of claim 1 in which the third subset includes every language that is in the first or second subsets.

3. The method of claim 1 in which each N-gram in the set of N-grams is a trigram.

4. The method of claim 1 in which each word in the set of words includes five characters or less.

5. The method of claim 1 in which at least one language in the third subset is in both the first and second subsets and in which the sample probability data obtained in (A1) for each language in both the first and second subsets includes information both from the language's N-gram probability data and from the language's word probability data.

6. The method of claim 5 in which every language in the third subset is in both the first and second subsets.

7. The method of claim 5 in which the third subset further includes at least one language that is in the first subset but not in the second subset.

8. The method of claim 5 in which, for each language in the third subset that is in both the first and second subsets, the N-gram probability data and the word probability data include, for each N-gram in the set of N-grams or for each word in the set of words, a probability value and in which (A1) includes:
(A1a) using the probability values for the N-grams and words that occur in the sample text to obtain the sample probability data for the language.

9. The method of claim 8 in which each probability value is logarithmic and in which (A1a) includes, for each language in the third subset that is in both the first and second subsets:
adding probability values for the N-grams that occur in the sample text to obtain a total N-gram probability value and adding probability values for words that occur in the sample text to obtain a total word probability value, the probability value for each N-gram and word that occurs in the sample text but is not in the set of N-grams or in the set of words being a constant probability value indicating a low probability; and
combining the total N-gram probability value and the total word probability value to obtain a sample probability value; the sample probability value being the sample probability data for the language.

10. The method of claim 9 in which the act of combining the total probability values comprises adding the total probability values and dividing by two.

11. A system for automatically identifying a natural language that is likely to be the predominant language of a sample text, the system comprising:
text data defining the sample text;
probability data for each of a set of natural languages; the probability data for each of a first subset that includes one or more of the languages including N-gram probability data and the probability data for each of a second subset that includes one or more of the languages including word probability data; the N-gram probability data for each language in the first subset indicating, for each of a set of N-grams, a probability that the N-gram occurs in a text if the language is the predominant language of the text; the word probability data of each language in the second subset indicating, for each of a set of words, a probability that the word occurs in a text if the language is the predominant language of the text; and
a processor connected for accessing the text data and the probability data; the processor operating to:
use the text data and the probability data to automatically obtain, for each of a third subset that includes at least two of the languages in the set, sample probability data indicating a probability that the sample text would occur in the language; for at least one language that is in the third subset and in the first subset, the sample probability data including information from the language's N-gram probability data; for at least one language that is in the third subset and in the second subset, the sample probability data including information from the language's word probability data; and use the sample probability data to automatically obtain language identifying data; the language identifying data identifying the language whose sample probability data indicate the highest probability.

12. An article of manufacture for use in a system for automatically identifying a natural language that is likely to be the predominant language of a sample text; the system including:
text data defining the sample text;
a storage medium access device; and
a processor connected for receiving data accessed on a storage medium by the storage medium access device and for accessing the text data;
the article of manufacture comprising:
a storage medium;
probability data for each of a set of natural languages, stored by the storage medium; the probability data for each of a first subset that includes one or more of the languages including N-gram probability data and the probability data for each of a second subset that includes one or more of the languages including word probability data; the N-gram probability data for each language in the first subset indicating, for each of a set of N-grams, a probability that the N-gram occurs in a text if the language is the predominant language of the text; the word probability data of each language in the second subset indicating, for each of a set of words, a probability that the word occurs in a text if the language is the predominant language of the text; and
instruction data stored by the storage medium; the instruction data indicating instructions the processor can execute; the processor, in executing the instructions:
using the text data and the probability data to automatically obtain, for each of a third subset that includes at least two of the languages in the set, sample probability data indicating a probability that the sample text would occur in the language; for at least one language that is in the third subset and in the first subset, the sample probability data including information from the language's N-gram probability data; for at least one language that is in the third subset and in the second subset, the sample probability data including information from the language's word probability data; and
using the sample probability data to automatically obtain language identifying data; the language identifying data identifying the language whose sample probability data indicate the highest probability.

13. A method of operating a first machine to transfer data to a second machine over a network, the second machine including a memory and a processor connected for accessing the memory and for receiving text data defining a sample text; the method comprising:

establishing a connection between the first and second machines over the network; and operating the first machine to transfer probability data for each of a set of natural languages and instruction data to the memory of the second machine;

the probability data for each of a first subset that includes one or more of the languages including N-gram probability data and the probability data for each of a second subset that includes one or more of the languages including word probability data; the N-gram probability data for each language in the first subset indicating, for each of a set of N-grams, a probability that the N-gram occurs in a text if the language is the predominant language of the text; the word probability data of each language in the second subset indicating, for each of a set of words, a probability that the word occurs in a text if the language is the predominant language of the text;

the instruction data indicating instructions the processor can execute; the processor, in executing the instructions, automatically identifying a natural language that is likely to be the predominant language of the sample text; the processor operating to:

use the text data and the probability data to automatically obtain, for each of a third subset that includes at least two of the languages in the set, sample probability data indicating a probability that the sample text would occur in the language; for at least one language that is in the third subset and in the first subset, the sample probability data including information from the language's N-gram probability data; for at least one language that is in the third subset and in the second subset, the sample probability data including information from the language's word probability data; and use the sample probability data to automatically obtain language identifying data; the language identifying data identifying the language whose sample probability data indicate the highest probability.

* * * * *